(12) United States Patent
Hasegawa et al.

(10) Patent No.: US 7,833,510 B2
(45) Date of Patent: Nov. 16, 2010

(54) METHOD FOR ACTIVATING HYDROGENATION CATALYST AND METHOD FOR PRODUCING HYDROGEN PEROXIDE INCLUDING SAME

(75) Inventors: Hiroshi Hasegawa, Ibaraki (JP); Katsuhiro Iura, Ibaraki (JP); Isao Hagiwara, Ibaraki (JP); Shinjiro Sawamoto, Ibaraki (JP)

(73) Assignee: Mitsubishi Gas Chemical Compayn, Inc., Tokyo (JP)

( * ) Notice: Subject to any disclaimer, the term of this patent is extended or adjusted under 35 U.S.C. 154(b) by 108 days.

(21) Appl. No.: 11/790,768

(22) Filed: Apr. 27, 2007

(65) Prior Publication Data
US 2008/0170985 A1  Jul. 17, 2008

(30) Foreign Application Priority Data
May 1, 2006  (JP) .............................. 2006-127522

(51) Int. Cl.
*C01B 15/023* (2006.01)
(52) U.S. Cl. ........................................ 423/588; 502/25
(58) Field of Classification Search ................. 423/588; 502/25
See application file for complete search history.

(56) References Cited

U.S. PATENT DOCUMENTS 3,214,385 A   10/1965  Kolyer
3,780,168 A   12/1973  Käbisch
4,394,302 A * 7/1983  Miller et al. ................. 502/313
6,126,914 A * 10/2000  Ogasawara et al. ......... 423/588

FOREIGN PATENT DOCUMENTS

GB   741444   12/1955
GB   787340   12/1957

\* cited by examiner

*Primary Examiner*—Melvin C Mayes
*Assistant Examiner*—Melissa Stalder
(74) *Attorney, Agent, or Firm*—Morgan, Lewis & Bockius LLP

(57) ABSTRACT

A method for producing hydrogen peroxide by an anthraquinone process includes the steps of: reducing with hydrogen a working solution containing an organic solvent and anthraquinone in the presence of a hydrogenation catalyst; and activating the hydrogenation catalyst when a hydrogenation selectivity has decreased due to repeated use, wherein the catalyst activation step includes a step of treating the hydrogenation catalyst with a first alkaline aqueous solution of pH 10 or above containing an alkali metal, and then washing the treated hydrogenation catalyst with water or a second alkaline aqueous solution that is more weakly alkaline than the first alkaline aqueous solution so as to set a catalyst soak solution comprising 5 parts by weight of pure water in admixture with 1 part by weight of the activated hydrogenation catalyst to a pH of 8.0 or above.

8 Claims, No Drawings

METHOD FOR ACTIVATING HYDROGENATION CATALYST AND METHOD FOR PRODUCING HYDROGEN PEROXIDE INCLUDING SAME

BACKGROUND OF THE INVENTION

1. Field of the Invention

The present invention relates to a method for activating a hydrogenation catalyst which, following continuous and repeated use in the production of hydrogen peroxide by the anthraquinone process, has a decreased hydrogenation selectivity and an increased by-product formation. The invention also relates to a method for producing hydrogen peroxide that includes such an activation step.

2. Description of the Related Art

The chief method for industrially producing hydrogen peroxide today is known as the anthraquinone process, and involves the use of an anthraquinone as the reaction medium. The anthraquinone is generally used after dissolution in a suitable organic medium. The organic solvent used for this purpose may comprise a single solvent or may be a mixed solvent, although a mixture of two different organic solvents is typically used. The solution prepared by dissolving the anthraquinone in the organic solvent is called a "working solution."

The anthraquinone process begins with a reduction step in which the anthraquinone within the above working solution is reduced by hydrogen in the presence of a catalyst (which reduction is referred to below as "hydrogenation"), thereby forming the corresponding anthrahydroquinone. Next, in an oxidation step, the anthrahydroquinone is oxidized with air or an oxygen-containing gas so as to convert it back to anthraquinone while at the same time producing hydrogen peroxide. An extraction step follows in which the hydrogen peroxide that was formed within the working solution is extracted, typically with water, and thereby separated from the working solution. The working solution from which the hydrogen peroxide has been extracted is then returned again to the reduction step, thus forming a cyclic process. This process, which essentially produces hydrogen peroxide from hydrogen and air, is an extremely effective process. Hydrogen peroxide is already being industrially produced using this cyclic process.

In the above-described cyclic process for producing hydrogen peroxide, because the working solution is circulated and reused, by-products such as alkyloxyanthrones and alkyltetrahydroanthraquinone epoxides that have formed due to hydrogenation of the anthraquinone and are no longer able to generate hydrogen peroxide gradually accumulate in the working solution as the production of hydrogen peroxide continues. The formation of such by-products which are incapable of producing hydrogen peroxide leads to a loss not only of the hydrogen supplied, but also of the high-cost anthraquinone. Such reactions are thus undesirable because they increase the production costs of the hydrogen peroxide.

The following methods for reclaiming and converting such by-products into anthraquinone have been described in the art. Japanese Patent Examined Publication No. S39-8806 discloses a method for treating the working solution with an alkali or an aqueous solution of an alkali. Japanese Patent Examined Publication No. S43-11658 discloses a method for treating the working solution in the reduced state with sodium hydroxide or sodium silicate at 120° C. These prior-art methods are able to revert the by-product to the original anthraquinone, but pose problems in terms of the wastewater and work efficiency associated with treating large amounts of the working solution. Also, Japanese Patent Examined Publication No. S45-19164 describes a method that involves ozone treatment followed by treatment with an aqueous solution of sodium hydroxide, then passage of the working solution through activated alumina at 70 to 75° C. Japanese Patent Examined Publication No. S49-41040 teaches a method in which the working solution is treated at 130° C. with a supported palladium catalyst in the presence of an olefin. These latter methods are capable of restoring the by-products to the original anthraquinone, yet losses are incurred due to the adsorptive removal to the catalyst of anthraquinone within the working solution. Japanese Patent Application Laid-open No. H9-278419 discloses a method in which the working solution prior to reduction is treated in the presence of a catalyst composed primarily of γ-alumina at a temperature of from 40 to 150° C. This method is able to revert by-products to the original anthraquinone without a large loss in the anthraquinone due to adsorptive removal to the catalyst. However, it does require the procurement of high-cost palladium catalyst and olefin. Because these drawbacks are factors that increase the cost of producing hydrogen peroxide, the life of the catalyst during which the catalytic activity and the selectivity for hydrogenation are sustained is important to the catalyst used for hydrogenating anthraquinone in the reduction step of the above-described cyclic process. Of these, the hydrogenation selectivity is an especially critical factor.

Catalysts that may be used to hydrogenate anthraquinones in the reduction step of the above-described cyclic process include Raney nickel catalysts, palladium black catalysts, and carrier-supported palladium catalysts. Raney nickel catalysts have a high activity, but many drawbacks. For example, they are severely degraded by trace amounts of hydrogen peroxide in the working solution, are dangerous to handle because Raney nickel is a spontaneously flammable metal, and have a low selectivity. Palladium black catalysts have an excellent activity and selectivity, but are difficult to separate from the working solution—a fatal drawback for the industrial production of hydrogen peroxide, which readily decomposes in the presence of palladium. Supported palladium catalysts, while having an activity and a selectivity which are somewhat inferior to those of palladium black catalysts, can be separated from the working solution, and are thus suitable as catalysts for the industrial production of hydrogen peroxide.

Various carrier-supported palladium catalysts have hitherto been described, including catalysts supported on such carriers as silica, alumina, silica-alumina, aluminosilicates or alkali metal carbonates. However, these do not satisfy all the conditions required of an industrial catalyst—namely, low cost, high catalytic strength, high activity and high selectivity. The carriers that are actually employed industrially are silica oxides, alumina oxides, and silica-alumina double oxides.

The inventors earlier discovered and filed a patent application for a method of preparing, as catalysts which address the foregoing needs: silica-supported palladium catalysts containing from 0.1 to 5 wt % of alkali metal (see Japanese Patent Application Laid-open No. H9-271671). These catalysts, because of their outstanding strength, activity and life, were high-performance catalysts capable of inhibiting the formation of by-products in the hydrogenation of anthraquinones.

However, even high-performance catalysts, when continuously and repeatedly used in the above-described cyclic process, undergo declines in activity and hydrogenation selectivity. A number of methods for activating such catalysts when the catalyst activity has degraded have hitherto been described in the art. For example, European Patent No. 670182-A discloses an activation method in which the degraded catalyst is treated with an oxidized working solution. However, this method is only capable of restoring catalyst activity by the desorption of hydroquinone that has deposited on the catalyst; it lacks the ability to augment the basic catalytic activity. Moreover, it does not appear to have a hydrogenation selectivity-improving effect. Japanese Patent Application Laid-open No. H9-173872 teaches a method for augmenting catalyst activity by treatment with acids such as mineral acids, sulfonic acid and oxalic acid. Although this method does have a catalytic activity-conferring effect, alkaline components that play a role in the hydrogenation selectivity end up being removed from the carrier, as a result of which a hydrogen selectivity improving effect is not observed. U.S. Pat. No. 2,925,391 discloses an activation method in which the degraded catalyst is treated at 80° C. with an aqueous solution of sodium hydroxide having a pH of 12 or above. However, strong alkali treatment does not always have an activating effect; in some cases, the properties of the catalyst carrier are compromised by such treatment, resulting in deactivation. For instance, in Comparative Example D described in Japanese Patent Application Laid-open No. H9-173872, treatment with a 5% solution of sodium hydroxide reportedly led to deactivation.

As noted above, there exists a need for the development of a catalyst activating method which confers the high activity and high selectivity that are distinctive characteristics of high-performance catalysts. In particular, there exists a strong need for a method of augmenting both the hydrogenation selectivity and activity of hydrogenation catalysts which, after continuous and repeated use in a hydrogen peroxide production plant using the anthraquinone process, have experienced a decline in hydrogenation selectivity and increased by-product formation (such a catalyst is referred to below as a "degraded hydrogenation catalyst"), without causing any damage to the catalyst itself.

SUMMARY OF THE INVENTION

Accordingly, one embodiment of the present invention provides a method for producing hydrogen peroxide by an anthraquinone process which includes the steps of: reducing with hydrogen a working solution containing an organic solvent and anthraquinone in the presence of a hydrogenation catalyst; and activating the hydrogenation catalyst when a hydrogenation selectivity has decreased due to repeated use. In the catalyst activation step, the hydrogenation catalyst is treated with a first alkaline aqueous solution of pH 10 or above containing an alkali metal. The treated hydrogenation catalyst is then washed with water or a second alkaline aqueous solution that is more weakly alkaline than the first alkaline aqueous solution so as to set a catalyst soak solution comprising 5 parts by weight of pure water in admixture with 1 part by weight of the activated hydrogenation catalyst to a pH of 8.0 or above.

In a preferred embodiment of the invention, washing may be carried out so as to set the catalyst soak solution to a pH in a range of from 8.0 to 11.5. In another preferred embodiment, the alkali metal-containing first alkaline aqueous solution may have a pH in a range of from 11.0 to 13.5. In yet another preferred embodiment, the alkali metal may be lithium, sodium or potassium. In a further preferred embodiment, the hydrogenation catalyst may be contacted with the alkali metal-containing first alkaline aqueous solution for a period of at least one minute. In a still further preferred embodiment, the hydrogenation catalyst may be contacted with the alkali metal-containing first alkaline aqueous solution at a temperature in a range of from 0 to 70° C.

In additional preferred embodiments, the hydrogenation catalyst may comprise a carrier and a metal compound which is supported on the carrier includes at least one metal selected from among palladium, rhodium, ruthenium and platinum, the content of the metal compound being from 0.1 to 10 wt %, based on the weight of the carrier. Moreover, the hydrogenation catalyst carrier may be at least one oxide selected from the group consisting of silica, silica-alumina, alumina, titania, zirconia, silica-alumina double oxides, silica-titania double oxides, silica-alumina-titania composite oxides and physical mixtures thereof, and may have a total pore volume of from 0.2 to 2.0 ml/g. Furthermore, the second alkaline aqueous solution may have a pH in a range of from 7.1 to 7.5. Also, washing in the catalyst activation step may be carried out with pure water.

The invention also provides a method for activating a hydrogenation catalyst, which method includes the step of treating, with a first alkaline aqueous solution of pH 10 or above containing an alkali metal, a hydrogenation catalyst used for producing hydrogen peroxide by an anthraquinone process when the catalyst has a decreased hydrogenation selectivity and increased by-product formation due to continuous and repeated use, and washing the treated hydrogenation catalyst with water or a second alkaline aqueous solution that is more weakly alkaline than the first alkaline aqueous solution, wherein washing is carried out so as to set a catalyst soak solution comprising 5 parts by weight of pure water in admixture with 1 part by weight of the washed catalyst to a pH of 8.0 or above.

By using the inventive method of activation on a hydrogenation catalyst which has been continuously and repeatedly used in the production of hydrogen peroxide by the anthraquinone process and which has incurred a decline in hydrogenation selectivity and an increase in by-product formation, organic contaminants on the surface of the catalyst can be effectively removed and the catalyst is maintained at a suitable alkalinity, thus making it possible to restore both the hydrogenation selectivity and activity of the hydrogenation catalyst without compromising the strength of the catalyst.

DESCRIPTION OF THE PREFERRED EMBODIMENTS

The invention is described more fully below. The following embodiments are intended merely to illustrate the invention. It is therefore to be understood that the present invention is not limited only to these embodiments, and may be practiced in various forms without departing from the spirit and scope thereof.

One embodiment of the present invention relates to a hydrogen peroxide production method by the anthraquinone process which includes the steps of reducing with hydrogen a working solution containing an organic solvent and anthraquinone in the presence of a hydrogenation catalyst having a selectivity for hydrogenation, and activating the hydrogenation catalyst when the hydrogenation selectivity has decreased due to repeated use.

As noted above, "working solution" refers herein to a solution prepared by dissolving anthraquinone in an organic solvent.

The anthraquinone used in the invention is preferably an alkylanthraquinone, an alkyltetrahydroanthraquinone, or a mixture thereof. It is also possible for the alkylanthraquinone and the alkyltetrahydroanthraquinone to be, respectively, a mixture of a plurality of alkylanthraquinones and a mixture of a plurality of alkyltetrahydroanthraquinones. Illustrative examples of alkylanthraquinones include ethylanthraquinone, t-butylanthraquinone and amylanthraquinone. Illustrative examples of alkyltetrahydroanthraquinones include ethyltetrahydroanthraquinone, t-butyltetrahydroanthraquinone and amyltetrahydroanthraquinone.

No particular limitation is imposed on the organic solvent used to prepare the working solution in the invention. Preferred organic solvents include combinations of an aromatic hydrocarbon with a higher alcohol, combinations of an aromatic hydrocarbon with a cyclohexanol or alkylcyclohexanol carboxylate, and tetrasubstituted urea.

The carrier of the hydrogenation catalyst used in the invention may be any material that is customarily used as a catalyst carrier, without particular limitation. However, it is preferable for the carrier to be at least one oxide selected from the group consisting of silica, silica-alumina, alumina, titania, zirconia, silica-alumina double oxides, silica-titania double oxides, silica-alumina-titania composite oxides, and physical mixtures thereof, and to have a total pore volume of from 0.2 to 2.0 ml/g. A silica or silica-alumina double oxide having a total pore volume of from 0.2 to 2.0 ml/g is more preferred.

The metal compound supported on the hydrogenation catalyst includes preferably at least one metal selected from among palladium, rhodium, ruthenium and platinum, and more preferably palladium. The content of the metal compound supported on the catalyst, while not critical to the effects of the invention, is preferably from 0.1 to 10 wt %, based on the weight of the carrier. The metal compound of the catalyst is generally supported in a metallic state, although it may be supported in the form of a compound such as an oxide which is easily reduced to a metal under the reaction conditions.

In the inventive method of preparing hydrogen peroxide, the above-described catalyst activation step includes treating the hydrogenation catalyst with a first alkaline aqueous solution of pH 10 or above containing an alkali metal, then washing the treated hydrogenation catalyst with water or a second alkaline aqueous solution that is more weakly alkaline than the first alkaline aqueous solution so as to set a catalyst soak solution comprising 5 parts by weight of pure water in admixture with 1 part by weight of the activated hydrogenation catalyst to a pH of 8.0 or above.

The alkali metal used in the invention may be any alkali metal in group Ia of the periodic table, although lithium, sodium and potassium are preferred. Illustrative, non-limiting examples of reagents containing these alkali metals include LiOH, NaOH, $Na_2CO_3$, $NaHCO_3$, $Na_2B_4O_7$, $Na_4P_2O_6$, $NaBO_2$, $NaNO_2$, $NaBO_3$, $Na_2HPO_4$, $Na_3PO_4$, $Na_2SiO_3$, $Na_6Si_2O_7$, $Na_2Si_3O_7$, $Na_2SnO_3$, $Na_2S$, $Na_2S_2O_3$, $Na_2WO_3$, $Al_2K_2O_4$, KOH, $BH_4K$, $K_2CO_3$, KCN, $KNO_2$, $C_6H_5OK$, $K_2HPO_4$, $K_3PO_4$, $K_4P_2O_7$, $K_2SnO_3$, $K_{18}H_{35}O_2$, $K_3SbS_4$ and $C_3H_5KS_2O$. The first alkaline aqueous solution containing an alkali metal has a pH of 10 or above, and preferably from pH 11.0 to 13.5.

Although the reason why the pH must be 10 or above is not yet well understood, the fact that alkyl phthalic acids—which are decomposition product of anthraquinone—are detected from the alkali treatment solution indicates that this is a suitable value representing a degree of alkalinity sufficient for dissolving out acidic catalyst poisons.

On the other hand, because alkaline aqueous solutions having a pH higher than 13.5 cause solvent damage such as carrier leaching, long-term treatment with such a solution may lower the catalyst performance.

In the practice of the invention, it is preferable to wash the degraded hydrogenation catalyst beforehand with a nonpolar organic solvent or the solvent used in the working solution, then to carry out a drying step or a water rinsing step. It is advantageous to then bring the catalyst into contact with the first alkaline aqueous solution containing an alkali metal and having a pH of 10 or above, and preferably from pH 11.0 to 13.5. The catalyst is contacted with the first alkaline aqueous solution for a period of preferably at least about 1 minute, and more preferably 30 minutes or more. There is no preferred upper limit in the length of the period of such contact. The temperature of the first alkaline aqueous solution is maintained within a range of preferably from 0 to 70° C., and more preferably from 10 to 60° C. The pressure, while not subject to any particular limitation, is preferably maintained at normal pressure.

Following treatment with the first alkaline aqueous solution, washing is carried out with water or a second alkaline aqueous solution of weaker alkalinity than the first alkaline aqueous solution. As used herein, "water" preferably refers to water that has been purified, such as by distillation, ion-exchange or reverse osmosis. Advantageous use can also be made of water purified by a method other than those mentioned above. It is especially preferable for the water used for washing to be pure water. The second alkaline aqueous solution has a pH of preferably from 7.1 to 7.9, and more preferably from 7.1 to 7.5. Regardless of which is used, it is essential for the catalyst soak solution comprising 5 parts by weight of pure water in admixture with 1 part by weight of the activated hydrogenation catalyst to have a pH of 8.0 or more. The pH of the catalyst soak solution is preferably in a range of from 8.0 to 11.5. This is a necessary and appropriate value for achieving an excellent hydrogenation selectivity.

These different treatment steps may be carried out by immersing the catalyst in vessels containing the respective liquids, or by passing the liquids through vessels that hold the catalyst.

Another embodiment of the invention provides a method for activating a hydrogenation catalyst, which method includes the steps of treating, with a first alkaline aqueous solution of pH 10 or above containing an alkali metal, a hydrogenation catalyst for producing hydrogen peroxide by an anthraquinone process when the catalyst has a decreased hydrogenation selectivity and increased by-product formation due to continuous and repeated use, and washing the treated catalyst with water or a second alkaline aqueous solution that is more weakly alkaline than the first alkaline aqueous solution, so as to set a catalyst soak solution comprising 5 parts by weight of pure water in admixture with 1 part by weight of the washed catalyst to a pH of 8.0 or above. The terms appearing in the present embodiment of the invention have the same meanings as already described above. Because this embodiment of the invention corresponds to the hydrogenation catalyst activation step in the foregoing hydrogen peroxide production method according to the invention, a detailed description is omitted here.

EXAMPLES

Examples of the invention are provided below by way of illustration and not by way of limitation. In the examples, unless otherwise noted, "%" signifies percent by weight. The alkali metal contents of the alkaline aqueous solutions are indicated in percent by weight based on water.

Alkali treatment of degraded hydrogenation catalyst that had been used in the production of hydrogen peroxide was carried out with a batch-type treatment apparatus. The method of treatment is described below. First, a treatment cell (made of SUS steel; 380 cc) in the above batch-type treatment apparatus was charged with 210 parts by weight of the degraded hydrogenation catalyst. Sintered metal filters (made of SUS steel; 40 μm) were mounted on either end of the treatment cell to prevent catalyst leakage. Using a pump (NP-S-701U, manufactured by Nihon Seimitsu Kagaku Co., Ltd.), an alkali solution containing a given alkali metal was passed through the cell for 3 hours at a flow rate of 1,400 ml/h. Once treatment with the alkali solution was complete, the alkali solution within the treatment apparatus was expelled with nitrogen gas, then pure water was passed through for 3 hours at a flow rate of 1,550 ml/h using the same pump, thereby washing the treated catalyst. The washed catalyst was dried at 120° C. for 2 hours.

The activity of the hydrogenation catalyst was evaluated using a batch-type evaluation apparatus. The method of evaluation is described below. A reactor in the batch-type evaluation apparatus was charged with 1 part by weight of the catalyst and 20 parts by weight of the working solution. A SUS steel stirring element was mounted in the reactor and the reactor was made airtight, following which the interior of the reaction system was flushed with hydrogen. Stirring was carried out at 1,000 rpm for 30 minutes, then the amount of hydrogen absorbed per unit catalyst was measured. The reaction temperature was controlled to 30° C. and the reaction pressure was controlled to normal pressure.

The hydrogenation selectivity of the hydrogenation catalyst was evaluated by using a circulation apparatus which circulates the working solution through a reduction step, oxidation step and extraction step, thereby generating hydrogen peroxide. An example of such an evaluation test is described. The hydrogenation reactor in the reduction step of the circulation apparatus was charged with 200 parts by weight of the catalyst to be tested, and the hydrogenation of anthraquinone was continuously carried out so as to produce hydrogen peroxide. While holding the volume of working solution within the hydrogenation reactor to about 4 liters, 0.25 L/min of working solution and 1.8 L/min of hydrogen were fed to the reactor. The working solution in which the anthraquinone had been hydrogenated was passed through a candle filter, thereby separating the solution from the catalyst and removing it from the hydrogenation reactor. Stirring was carried out with a tilted turbine blade so as to achieve sufficient mixing by means of baffles attached to the inside wall of the reactor. The reaction temperature during hydrogenation was set at 40° C.

The working solution used was obtained by dissolving amylanthraquinone to a concentration of 0.6 mol/L in a mixed solvent comprising 60 vol % 1,2,4-trimethylbenzene and 40 vol % diisobutylcarbinol. The total amount of working solution within the circulation apparatus was set to about 40 liters.

The hydrogenation selectivity was determined by using liquid chromatography to measure the concentrations of amylanthraquinone, amyloxyanthrone and amyltetrahydroanthraquinone in the working solution after 200 hours of hydrogen peroxide production in the circulation reactor, and calculating from these concentrations the amounts of amylanthraquinone, amyloxyanthrone, amyltetrahydroanthraquinone and other by-products produced in the reduction step. Hydrogenation selectivities were expressed as ratios of the amounts of by-products that formed relative to the amount of the chief product that formed. Degradation in the activity of the hydrogenation catalyst was evaluated in terms of the rate of increase in the hydrogen partial pressure. That is, a catalyst that has undergone less degradation in activity will exhibit a smaller rate of increase in the hydrogen partial pressure.

To verify the alkalization of the catalyst, a catalyst soak solution obtained by mixing, in a plastic container, 5 parts by weight of pure water with 1 part by weight of the catalyst was left at rest for about 10 minutes while tightly sealed to avoid the influence of carbon dioxide in air, following which the pH of the supernatant of this catalyst soak solution was measured with a pH meter (model PH82, manufactured by Yokogawa Electric Corporation).

Example 1

The batch-type treatment apparatus described above was charged with 210 parts by weight of a silica-supported palladium catalyst (see Japanese Patent Application Laid-open No. H9-271671) having a decreased hydrogenation selectivity and an increased by-product formation, and an aqueous solution of sodium hydroxide having a pH 12.8 was passed through for 3 hours at a flow rate of 1,400 ml/h. The temperature was held at from 25 to 30° C. The alkali wastewater at the completion of alkali treatment exhibited a brown color. Upon analysis of this treatment solution by liquid chromatography-mass spectrometry (LC-MS), organic acid compounds such as amyl phthalic anhydride that are products of anthraquinone modification were detected. After the completion of alkali solution treatment, the alkali solution within the treatment apparatus was expelled with nitrogen gas, following which the catalyst was washed by passing through pure water for 3 hours at a flow rate of 1,550 ml/h. The rinsed catalyst was then dried for 2 hours at 120° C.

Elemental analysis of this catalyst by x-ray photoelectron spectroscopy (XPS) showed that, compared to before treatment, the amount of carbon on the catalyst surface had decreased and the ratio of metallic palladium on the catalyst surface had increased. Organic contaminants on the surface of the catalyst were thus effectively removed by the above treatment. The catalyst soak solution had a pH of 9.3.

The above-described evaluation test was used to evaluate the catalyst following activation treatment. The increase in the hydrogen partial pressure after 200 hours of operation was 9.4 Pa/h. No clogging of the filter due to catalyst fragmentation or the like occurred. Results obtained for hydrogenation selectivity and catalyst activity are shown in Table 1.

Example 2

A catalyst was subjected to activation treatment by the same method as in Example 1. However, an aqueous solution of sodium hydroxide having a pH of 12.2 was used instead of an aqueous solution of sodium hydroxide having a pH of 12.8. The alkali wastewater at the completion of alkali treatment exhibited a brown color, and organic acid compounds such as amyl phthalic anhydride were detected. The catalyst soak solution had a pH of 8.5.

The above-described evaluation test was used to evaluate the catalyst following activation treatment. The increase in the hydrogen partial pressure after 200 hours of operation was 9.7 Pa/h. No clogging of the filter due to catalyst fragmentation or the like occurred. Results obtained for hydrogenation selectivity and activity are shown in Table 1.

Example 3

A catalyst was subjected to activation treatment by the same method as in Example 1. However, an aqueous solution of sodium hydroxide having a pH of 13.1 was used instead of an aqueous solution of sodium hydroxide having a pH of 12.8. The alkali wastewater at the completion of alkali treatment exhibited a brown color, and organic acid compounds such as amyl phthalic anhydride were detected. The catalyst soak solution had a pH of 10.0.

The above-described evaluation test was used to evaluate the catalyst following activation treatment. The increase in the hydrogen partial pressure after 200 hours of operation was 9.6 Pa/h. No clogging of the filter due to catalyst fragmentation or the like occurred. Results obtained for hydrogenation selectivity and activity are shown in Table 1.

Example 4

A catalyst was subjected to activation treatment by the same method as in Example 1. However, an aqueous solution of sodium carbonate decahydrate having a pH of 11.5 was used instead of the aqueous solution of sodium hydroxide having a pH of 12.8. The alkali wastewater at the completion of alkali treatment exhibited a brown color, and organic acid compounds such as amyl phthalic anhydride were detected. The catalyst soak solution had a pH of 9.3.

The above-described evaluation test was used to evaluate the catalyst following activation treatment. The increase in the hydrogen partial pressure after 200 hours of operation was 9.6 Pa/h. No clogging of the filter due to catalyst fragmentation or the like occurred. Results obtained for hydrogenation selectivity and activity are shown in Table 1.

Example 5

A catalyst was subjected to activation treatment by the same method as in Example 1. However, an aqueous solution of potassium hydroxide having a pH of 12.2 was used instead of the aqueous solution of sodium hydroxide having a pH of 12.8. The alkali wastewater at the completion of alkali treatment exhibited a brown color, and organic acid compounds such as amyl phthalic anhydride were detected. The catalyst soak solution had a pH of 8.6.

The above-described evaluation test was used to evaluate the catalyst following activation treatment. The increase in the hydrogen partial pressure after 200 hours of operation was 9.6 Pa/h. No clogging of the filter due to catalyst fragmentation or the like occurred. Results obtained for hydrogenation selectivity and activity are shown in Table 1.

Example 6

A catalyst was subjected to activation treatment by the same method as in Example 1. However, instead of a degraded silica-supported palladium catalyst (see Japanese Patent application Laid-open No. H9-271671), use was made of a silica/alumina-supported palladium catalyst (K-0290, produced by Heraeus K K) having a decreased hydrogenation selectivity and an increased by-product formation. The alkali wastewater at the completion of alkali treatment exhibited a brown color, and organic acid compounds such as amyl phthalic anhydride were detected. The catalyst soak solution had a pH of 8.9.

The above-described evaluation test was used to evaluate the catalyst following activation treatment. The increase in the hydrogen partial pressure after 200 hours of operation was 9.5 Pa/h. No clogging of the filter due to catalyst fragmentation or the like occurred. Results obtained for hydrogenation selectivity and activity are shown in Table 1.

Example 7

A catalyst was subjected to activation treatment by the same method as in Example 1. However, instead of a degraded silica-supported palladium catalyst (see Japanese Patent application Laid-open No. H9-271671), use was made of a silica/alumina-supported palladium catalyst (K-0290, produced by Heraeus K K) having a decreased hydrogenation selectivity and an increased by-product formation. Also, an aqueous solution of sodium carbonate decahydrate having a pH of 11.5 was used instead of the aqueous solution of sodium hydroxide having a pH of 12.8. The alkali wastewater at the completion of alkali treatment exhibited a brown color, and organic acid compounds such as amyl phthalic anhydride were detected. The catalyst soak solution had a pH of 8.3.

The above-described evaluation test was used to evaluate the catalyst following activation treatment. The increase in the hydrogen partial pressure after 200 hours of operation was 9.5 Pa/h. No clogging of the filter due to catalyst fragmentation or the like occurred. Results obtained for hydrogenation selectivity and activity are shown in Table 1.

Comparative Example 1

As a control, 210 g of a silica-supported palladium catalyst (see Japanese Patent application Laid-open No. H9-271671) having a decreased hydrogenation selectivity and an increased by-product formation was washed with 1,050 ml of 1,2,4-trimethylbenzene. Upon LC-MS analysis of this treatment solution, substantially no organic acid compounds such as amyl phthalic anhydride, which are products of anthraquinone modification, were detected. The washed catalyst was dried at 120° C. for 5 hours. Elemental analysis of the catalyst was carried out by XPS, from which it was found that the amount of carbon on the catalyst surface did not change much before and after treatment. The catalyst soak solution had a pH of 7.6.

The above-described evaluation test was used to evaluate the catalyst following activation treatment. The increase in the hydrogen partial pressure after 200 hours of operation was 9.5 Pa/h. No clogging of the filter due to catalyst fragmentation or the like occurred. Results obtained for hydrogenation selectivity and activity are shown in Table 1.

Comparative Example 2

As a control, 210 g of a silica/alumina-supported palladium catalyst (K-0290, produced by Heraeus K K) having a decreased hydrogenation selectivity and an increased by-product formation was washed with 1,050 ml of 1,2,4-trimethylbenzene, then dried at 120° C. for 5 hours. The catalyst soak solution had a pH of 8.1.

The above-described evaluation test was used to evaluate the catalyst following activation treatment. The increase in the hydrogen partial pressure after 200 hours of operation was 9.3 Pa/h. No clogging of the filter due to catalyst fragmentation or the like occurred. Results obtained for hydrogenation selectivity and activity are shown in Table 1.

Comparative Example 3

As a control, 210 g of a silica-supported palladium catalyst (see Japanese Patent application Laid-open No. H9-271671) having a decreased hydrogenation selectivity and an increased by-product formation was charged into the above-described batch-type treatment apparatus, and the catalyst was washed by passing through the apparatus, at a flow rate of 1,400 ml/h for 3 hours, an aqueous solution of sodium hydroxide having a pH of 10.1 instead of an aqueous solution of sodium hydroxide having a pH of 12.8. The temperature was held in a range of from 25 to 30° C. The alkali wastewater at the completion of alkali treatment exhibited a light brown color, and trace amounts of organic acid compounds such as amyl phthalic anhydride were detected.

After the completion of treatment with the alkali solution, the alkali solution within the treatment apparatus was expelled with nitrogen gas, following which the catalyst was washed by passing pure water through the apparatus at a rate of 1,550 ml/h for 10 hours. The rinsed catalyst was then dried for 2 hours at 120° C. The catalyst soak solution had a pH of 6.8.

The above-described evaluation test was used to evaluate the catalyst following activation treatment. The increase in the hydrogen partial pressure after 200 hours of operation was 9.6 Pa/h. No clogging of the filter due to catalyst fragmentation or the like occurred. Results obtained for hydrogenation selectivity and activity are shown in Table 1.

Comparative Example 4

As a control, a catalyst was subjected to activation treatment by the same method as in Example 1, except that treatment was carried out for 3 hours using an aqueous solution of sodium hydroxide having a pH of 13.4 while holding the temperature at 80° C. instead of in a range of 25 to 30° C. The catalyst following alkali treatment decomposed, and was thus impossible to sample.

Comparative Example 5

As a control, a catalyst was subjected to activation treatment by the same method as in Example 1, except that 15 vol % nitric acid was used instead of an aqueous solution of sodium hydroxide having a pH of 12.8.

The above-described evaluation test was used to evaluate the catalyst following activation treatment. The increase in the hydrogen partial pressure after 200 hours of operation was 9.7 Pa/h. No clogging of the filter due to catalyst fragmentation or the like occurred. Results obtained for hydrogenation selectivity and activity are shown in Table 1.

Comparative Example 6

As a control, a catalyst was subjected to activation treatment by the same method as in Example 1. However, a silica/alumina-supported palladium catalyst (K-0290, produced by Heraeus K K) having a decreased hydrogenation selectivity and an increased by-product formation was used instead of a degraded silica-supported palladium catalyst (see Japanese Patent application Laid-open No. H9-271671), and treatment was carried out for 3 hours with an aqueous solution of sodium hydroxide having a pH of 13.4 while holding the temperature at 80° C. instead of in a range of 25 to 30° C. The catalyst following alkali treatment decomposed, and was thus impossible to sample.

Comparative Example 7

As a control, a catalyst was subjected to activation treatment by the same method as in Example 1. However, a silica/alumina-supported palladium catalyst (K-0290, produced by Heraeus K K) having a decreased hydrogenation selectivity and an increased by-product formation was used instead of a degraded silica-supported palladium catalyst (see Japanese Patent application Laid-open No. H9-271671), and treatment was carried out using 15 vol % nitric acid instead of an aqueous sodium hydroxide solution having a pH of 12.8.

The above-described evaluation test was used to evaluate the catalyst following activation treatment. The increase in the hydrogen partial pressure after 200 hours of operation was 9.5 Pa/h. No clogging of the filter due to catalyst fragmentation or the like occurred. Results obtained for hydrogenation selectivity and activity are shown in Table 1.

Reference Example 1

As a reference example, fresh silica-supported palladium catalyst (see Japanese Patent application Laid-open No. H9-271671) was evaluated using the above-described evaluation test. The catalyst soak solution for this catalyst had a pH of 9.3. The increase in the hydrogen partial pressure after 200 hours of operation was 9.3 Pa/h. No clogging of the filter due to catalyst fragmentation or the like occurred. Results obtained for hydrogenation selectivity and activity are shown in Table 1.

Reference Example 2

As a reference example, fresh silica/alumina-supported palladium catalyst (K-0290, produced by Heraeus K K) was evaluated using the above-described evaluation test. The catalyst soak solution for this catalyst had a pH of 10.0. The increase in the hydrogen partial pressure after 200 hours of operation was 9.5 Pa/h. No clogging of the filter due to catalyst fragmentation or the like occurred. Results obtained for hydrogenation selectivity and activity are shown in Table 1.

TABLE 1

| Example No. | Alkali treatment solution (pH) | Catalyst soak solution (pH) | Catalyst activity ratio[2] (%) | By-product formation ratio[1] OH[3] | By-product formation ratio[1] TH[4] |
|---|---|---|---|---|---|
| Example 1 | 12.8 | 9.3 | 144 | 1/900 | <1/5000 |
| Example 2 | 12.2 | 8.5 | 120 | 1/1000 | 1/3500 |
| Example 3 | 13.1 | 10.0 | 153 | 1/950 | <1/5000 |
| Example 4 | 11.5 | 9.3 | 123 | 1/950 | 1/3000 |
| Example 5 | 12.2 | 8.6 | 131 | 1/900 | <1/5000 |
| Example 6 | 12.8 | 8.9 | 71 | 1/1100 | <1/5000 |
| Example 7 | 11.5 | 8.3 | 69 | 1/900 | 1/3000 |
| Comp. Ex. 1 | — | 7.6 | 100 | 1/650 | 1/1100 |
| Comp. Ex. 2 | — | 8.1 | 64 | 1/500 | 1/1500 |
| Comp. Ex. 3 | 10.1 | 6.8 | 100 | 1/1000 | 1/1200 |
| Comp. Ex. 4 | 13.4 (80° C.) | — | Dissolved | — | — |
| Comp. Ex. 5 | nitric acid | — | 116 | 1/250 | 1/300 |
| Comp. Ex. 6 | 13.4 (80° C.) | — | Dissolved | — | — |
| Comp. Ex. 7 | nitric acid | — | 72 | 1/300 | 1/400 |
| Ref. Ex. 1 | — | 9.3 | 209 | 1/1300 | 1/3000 |
| Ref. Ex. 2 | — | 10.0 | 106 | 1/1500 | <1/5000 |

[1]Ratio of by-products formed to the main product
[2]Ratio of amount of hydrogen absorbed with respect to silica-supported palladium catalyst (see Comparative Example 1 in Japanese Patent Application Laid-open No. H9-271671)
[3]Amyloxyanthrone
[4]Amyltetrahydroanthraquinone It is apparent from the results in Table 1 that the by-product formation ratio was low in Examples 1 to 7. This was especially the case for amyltetrahydroanthraquinone.

It will be understood by those of skill in the art that numerous and various modifications can be made without departing from the spirit of the present invention. Therefore, it should be clearly understood that the forms of the present invention described herein are illustrative only and are not intended to limit the scope of the invention.

What is claimed is:
1. A method for producing hydrogen peroxide by an anthraquinone process, comprising the steps of:
    reducing with hydrogen a working solution containing an organic solvent and anthraquinone in the presence of a hydrogenation catalyst; and activating the hydrogenation catalyst when a hydrogenation selectivity has decreased due to repeated use, wherein the catalyst activation step includes a step of treating the hydrogenation catalyst with a first alkaline aqueous solution of a pH in the range of from 11.0 to 13.5 containing an alkali metal, and then washing the treated hydrogenation catalyst with water or a second alkaline aqueous solution of a pH in a range of from 7.1 to 7.5 so as to set a catalyst soak solution comprising 5 parts weight of pure water in admixture with 1 part by weight of the activated hydrogenation catalyst, wherein washing is carried out so as to set the catalyst soak solution to a pH in a range of from 8.0 to 11.5, and wherein said hydrogenation catalyst comprises a carrier which comprises at least one oxide selected from the group consisting of silica, silica alumina, alumina, titania, zirconia, silica-alumina double oxides, silica-titania double oxides, silica-alumina-titania composite oxides and physical mixtures thereof, and has a total pore volume of from 0.02 to 2 ml/g.

2. The method for producing hydrogen peroxide according to claim 1, wherein the alkali metal is lithium, sodium or potassium.

3. The method for producing hydrogen peroxide according to claim 1, wherein the hydrogenation catalyst is contacted with the alkali metal-containing first alkaline aqueous solution for a period of at least one minute.

4. The method for producing hydrogen peroxide according to claim 3, wherein the period of contact is at least 30 minutes.

5. The method for producing hydrogen peroxide according to claim 1, wherein the hydrogenation catalyst is contacted with the alkali metal-containing first alkaline aqueous solution at a temperature in a range, of from 0 to 70° C.

6. The method for producing hydrogen peroxide according to claim 5, wherein the temperature, of the first alkaline aqueous solution is in a range of from 10 to 60° C.

7. The method for producing hydrogen peroxide according to claim 1, wherein the hydrogenation catalyst comprises a carrier and a metal compound which is supported on the carrier, wherein the metal compound includes at least one metal selected from among palladium, rhodium, ruthenium and platinum, the content of the metal compound being from 0.1 to 10 wt%, based on the weight of the carrier.

8. The method for producing hydrogen peroxide according to claim 1, wherein washing in the catalyst activation step is carried out with pure water.

* * * * *